US009146631B1

(12) United States Patent  
Gray et al.

(10) Patent No.: US 9,146,631 B1  
(45) Date of Patent: Sep. 29, 2015

(54) DETERMINING WHICH HAND IS HOLDING A DEVICE

(71) Applicant: Amazon Technologies, Inc., Reno, NV (US)

(72) Inventors: Timothy Thomas Gray, Seattle, WA (US); Dong Zhou, San Jose, CA (US); Kenneth Mark Karakotsios, San Jose, CA (US); Jennifer Silva, Los Altos, CA (US)

(73) Assignee: Amazon Technologies, Inc., Reno, NV (US)

(*) Notice: Subject to any disclaimer, the term of this patent is extended or adjusted under 35 U.S.C. 154(b) by 164 days.

(21) Appl. No.: 13/764,567

(22) Filed: Feb. 11, 2013

(51) Int. Cl.  
*G06F 3/041* (2006.01)

(52) U.S. Cl.  
CPC ...................................... *G06F 3/041* (2013.01)

(58) Field of Classification Search  
CPC .......................................................... G06F 3/041  
USPC .................................. 345/168, 173; 715/773  
See application file for complete search history.

(56) References Cited

U.S. PATENT DOCUMENTS

| 2008/0300055 A1* | 12/2008 | Lutnick et al. ................. 463/39 |
| 2010/0060604 A1* | 3/2010 | Zwart et al. ................... 345/173 |
| 2011/0043475 A1* | 2/2011 | Rigazio et al. ................ 345/173 |
| 2012/0293450 A1* | 11/2012 | Dietz et al. .................... 345/174 |
| 2013/0033418 A1* | 2/2013 | Bevilacqua et al. ........... 345/156 |
| 2013/0197681 A1* | 8/2013 | Alberth et al. ................. 700/94 |

* cited by examiner

Primary Examiner — Kent Chang  
Assistant Examiner — Mark Edwards  
(74) *Attorney, Agent, or Firm* — Novak Druce Connolly Bove + Quigg LLP (57) ABSTRACT

A computing device can obtain information about how the device is held, moved, and/or used by a hand of a user holding the device. The information can be obtained utilizing one or more sensors of the device independently or working in conjunction. For example, an orientation sensor can determine whether a left hand or a right hand is likely rotating, tilting, and/or moving, and thus holding, the device. In another example, a camera and/or a hover sensor can obtain information about a finger position of the user's hand to determine whether the hand is likely a left hand or a right hand. In a further example, a touch sensor can determine a shape of an imprint of a portion of the user's hand to determine which hand is likely holding the device. Based on which hand is holding the device, the device can improve one or more computing tasks.

22 Claims, 9 Drawing Sheets

DETERMINING WHICH HAND IS HOLDING A DEVICE

BACKGROUND

Computing devices are becoming more commonplace and are used for a wide variety of purposes. Computing devices can be used to display content including media such as pictures and videos, or documents such as articles and electronic books. Moreover, computing devices can present user interfaces for users to interact with the devices. For example, a computing device can provide buttons in the form of a keyboard for a user to submit input for an application running on the device. Also, a user can hold a computing device with one hand. However, due to the smaller size of some computing devices, content configured to be displayed at a particular location on a display screen of a smaller computing device may be blocked from view by the user's hand that is holding the device. Moreover, hand sizes can differ for different users, therefore making it difficult or inconvenient when a button or user interface is configured to be presented at a location on the device that is difficult for the user's hand to access (e.g., for the user's thumb/finger to reach). When the user is holding and operating the device with one hand, it can reduce the overall user experience when content is blocked from view by the hand and/or when a user interface is difficult or inconvenient to access using the hand.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to configuring a computing device for operation by a user. In particular, various embodiments of the present disclosure can determine which of a user's hand is holding a computing device. For example, utilizing one or more sensors of the computing device, the device can determine (i.e., identify) whether the user's left hand or right hand (or both hands) is holding the device. Based on having determined which hand (or both hands) is holding the computing device, various embodiments of the present disclosure can configure the device (e.g., select an operation mode or state for the device, modify applications run on the device, etc.) to improve one or more operations performed.

At least some embodiments enable a computing device to utilize one or more sensors on the device to obtain information indicative of how the device is held, moved, and/or used by a user's hand that is holding the device. In some embodiments, the computing device can utilize one or more orientation sensors (e.g., gyroscope, accelerometer, etc.) of the device to determine a pivot point for a tilt/rotation or other movement to the device. How a user moves the device in his/her left hand can be distinguishable from how the user moves the device in his/her right hand. For example, the pivot point for the movement of the device in the left hand can be different from the pivot point for the movement of the device in the right hand. Based on this movement (e.g., rotation, tilt) differentiation, the device can determine the hand that holds the device.

In some embodiments, the computing device can utilize one or more image sensors (e.g., camera) and/or one or more hover sensors (e.g., electromagnetic field sensor, infrared sensor, capacitive sensor array capable of generating outward electric fields to detect a hovering object, etc.) to detect an occlusion of a user's finger hovering over the device. For example, utilizing a front-facing camera(s) and/or hover sensor(s), the device can determine that the user's thumb is hovering (and/or moving) in a particular direction over the front face of the device. In another example, the device can determine that the user's pointing finger (e.g., any finger that intended to be used to interact with the device) is hovering (and/or moving) in a particular direction over the front face of the device. In some embodiments, the device can determine that a pointing object (used by another hand different from the hand holding the device; e.g., a stylus) is hovering in a particular direction over the front face of the device. Based on the hovering (and/or moving) of the user's thumb/finger, the device can determine which hand is holding the device.

In some embodiments, the computing device can utilize one or more touch sensors (e.g., touch screen) to determine a shape of an imprint (i.e., contact) of an object touching the one or more touch sensors. For example, utilizing the touch sensor, the device can determine that the base of the thumb (i.e., thenar area) is touching a particular side of the touch sensor. In another example, the device can recognize and distinguish between the shape of an imprint made by a thumb touching the touch sensor versus the shape of an imprint made by another finger (e.g., index finger) or another portion of the hand (e.g., thenar area) touching the touch sensor or a pointing object (e.g., stylus). Based on this touch imprint differentiation, the device can determine the hand that is holding the device.

It can be advantageous for the computing device to know which hand the user is holding the device with. Based on knowing which hand (or both hands) is holding the computing device, various embodiments of the present disclosure can configure the device to improve one or more operations performed. In some embodiments, knowing which hand is holding the device would enable the device to use different tilt/movement thresholds for different tilts/movements to allow for improved detection/recognition of gestures (e.g., subtle gestures). In some embodiments, the device can modify the position of touch targets (e.g., buttons, user interfaces, etc.)

and elements presented (e.g., displayed) to the user in order to optimize ease of use depending on which of the user's hand is holding the device.

Figure 1:
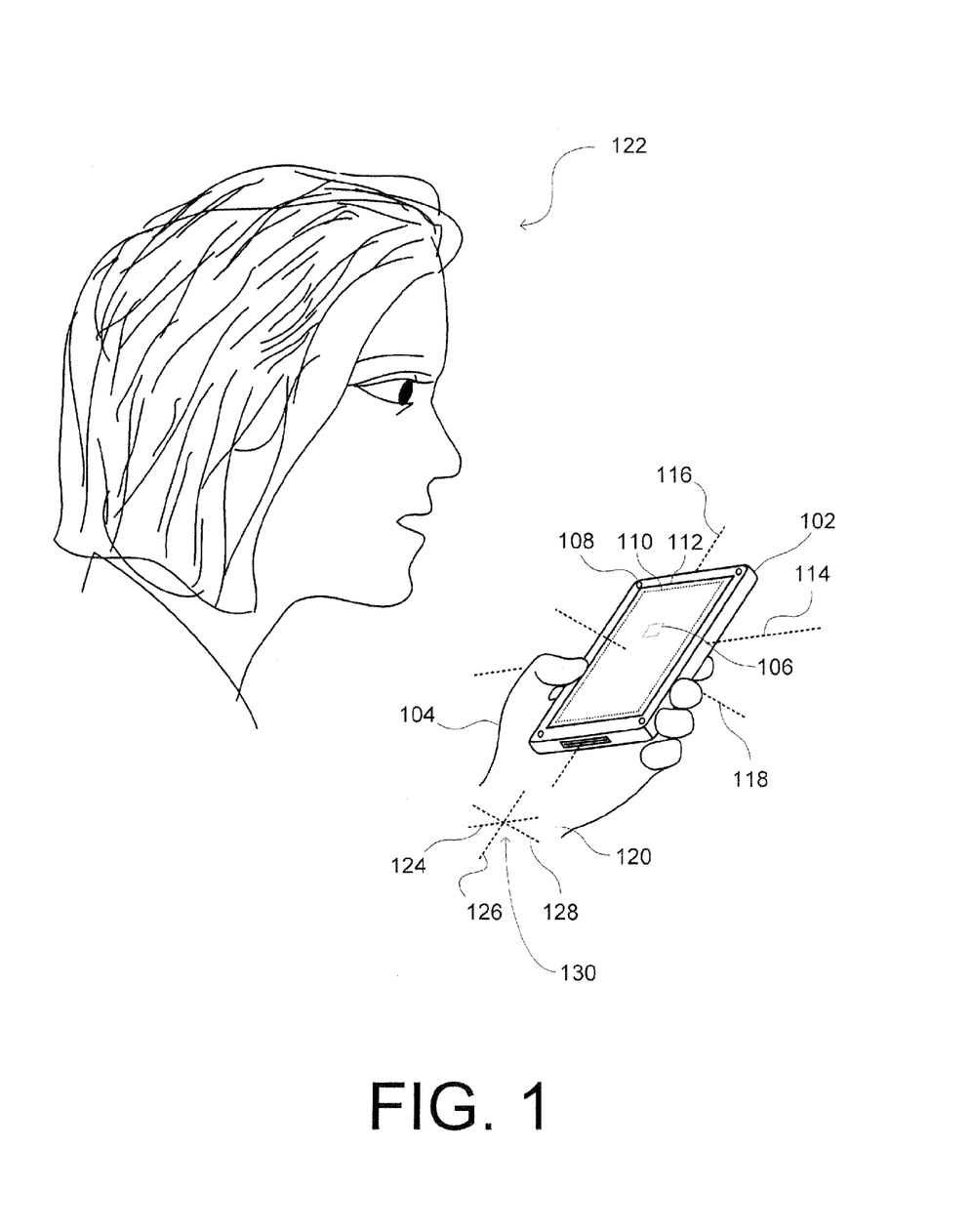
FIG. 1 illustrates an example environment in which aspects of the various embodiments can be utilized.

The one or more sensors of the device can be used independently or in conjunction to facilitate in the determination of which hand is holding the device. Various other functions and advantages are described and suggested below as may be provided in accordance with the various embodiments FIG. 1 illustrates an example environment 100 in which aspects of the various embodiments can be utilized. The example environment 100 can comprise a computing device 102, a hand 104 holding the computing device 102, and a user 122 of the computing device 102 whose hand 104 is holding the device 102. The computing device 102 can comprise one or more orientation sensors 106, one or more cameras 108, one or more hover sensors 110, and one or more touch sensors 112.

The one or more orientation sensors 106 can include one or more gyroscopes, accelerometers, compasses, magnetometers, inertia sensors, virtual orientation sensors, etc. The one or more orientation sensors 106 can be configured to facilitate in determining an orientation of the computing device 102 and any changes in the orientation of the device 102. For example, there can be at least three axes with respect to the computing device 102, including a horizontal axis (i.e., abscissa or X axis) 114, a vertical axis (i.e., ordinate or Y axis) 116, and a depth axis (i.e., applicate or Z axis) 118. The orientation of the computing device 102 can be determined utilizing the one or more orientation sensors 106 with respect to one or more of the axes 114, 116, and/or 118. Moreover, a change in the orientation of the computing device 102 can be caused by a tilt, turn, twist, movement, etc., to the device 102 with respect to one or more of the axes 114, 116, and/or 118.

In some embodiments, there can be a rotation/tilt (e.g., pitch, roll, yaw, etc.) of the computing device 102 with respect to one or more axes located at a wrist 120 of the hand 104 holding the device 102. In other words, the wrist 120 can be a pivot point for rotating/tilting/turning the device 102. For example, the user 122 holding the device 102 with his/her hand 104 can rotate his/her wrist 120 in order to move the computing device 102. There can be at least three axes with respect to the wrist 120 including a horizontal axis (i.e., abscissa or X axis) 124, a vertical axis (i.e., ordinate or Y axis) 126, and a depth axis (i.e., applicate or Z axis) 128, each of the wrist axes (e.g., 124, 126, 128) being substantially parallel (i.e., parallel within an allowable deviation) to a respective one of the computing device axes (e.g., 114, 116, 118). Utilizing at least in part the one or more orientation sensors 106, the computing device 102 can determine various changes in the orientation of the device 102 with respect to the wrist axes (e.g., 124, 126, 128). In some embodiments, a reference point at each wrist axis can be re-established based on how the user is holding the computing device 102, thereby enabling the one or more orientation sensors 106 to determine various changes with respect to the wrist axes. For example, the reference point 130 can be (re-)established to be at substantially the wrist of the hand that is holding the device 102.

The computing device can comprise one or more cameras 108. The one or more cameras 108 can be configured to capture images including still pictures, videos, etc. The one or more cameras 108 can also be configured to captured infrared (IR) light, which can be emitted from the computing device 102 useful for illumination in a dark environment and/or for determining depth. In some embodiments, there can be multiple cameras 108, such as one camera in each corner of the front face of the device 102.

The computing device can comprise one or more hover sensors 110. In some embodiments, the one or more hover sensors 110 can be a hover sensor array with capacitive capabilities. The hover sensor(s) 110 can generate electromagnetic fields (EMFs) that extend outward from the sensor through a touch sensor and/or display (e.g., touch screen) of the computing device. The hover sensor(s) 110 can detect the presence and location of an object, such as a finger (including a thumb), hovering above the front face of the device 102 within a specified distance, without the object having to touch the device.

Moreover, the computing device can also comprise one or more touch sensors 112. In some embodiments, the touch sensor(s) 112 can work in conjunction with a display of the device 102 to function as a touch screen. The touch sensor 112 (e.g., touch screen) can be configured to detect one or more fingers (including thumbs) that touch (e.g., tap, press, pinch, etc.) the sensor 112.

In some embodiments, the term "finger" can refer to a thumb, an index finger, a middle finger, a ring finger, a pinky finger, or any other limb/appendage of a hand.

Utilizing at least some of the above sensors either alone or working in combination, the computing device 102 can determine whether the hand 104 holding the device 102 is a left hand or a right hand. In some embodiments, based on determining which hand (e.g., left or right) is holding the device 102, the device 102 can modifying the performance of various computing tasks. For example, if it is determined that the user's right hand is holding the device 102, then perhaps content can be displayed on a left portion of the display of the device 102 such that the content is not blocked from view by the user's right hand holding the device 102. In another example, if the device 102 determines that the user's left hand is holding the device 102, then perhaps the device 102 can present an interface (e.g., buttons, keyboard, etc.) for interacting with the device 102 in a lower left area of the front face of the device 402 such that the interface is closer and/or more convenient for the thumb of the user's left hand.

Figure 2A:
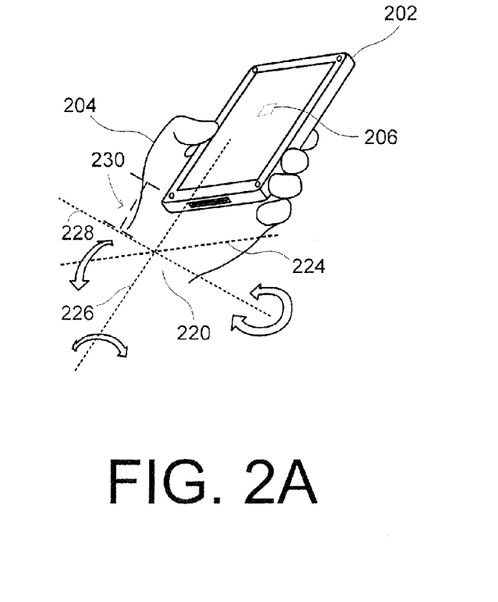
FIG. 2A illustrates an example embodiment for determining which hand is holding a device, based on device rotation.
Figure 2B:
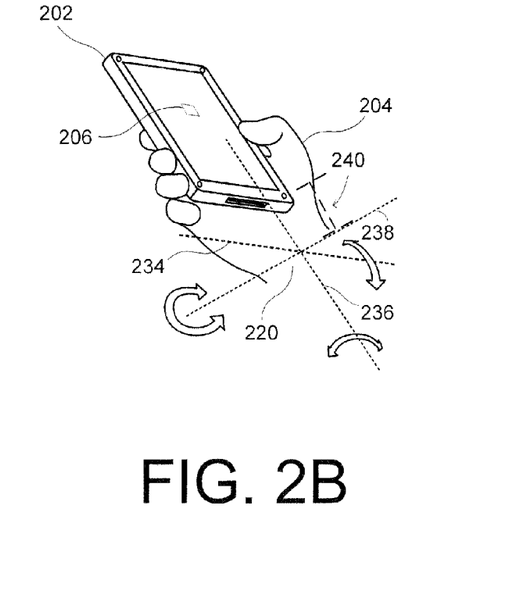
FIG. 2B illustrates an example embodiment for determining which hand is holding a device, based on device rotation.

FIG. 2A and FIG. 2B each illustrate an example embodiment for determining which hand is holding a device, based on device rotation. Each example can include a computing device 202, a hand 204 of a user of the computing device 202, the hand 204 including a wrist 220. The had 204 can hold the device 202. The device 202 can comprise at least one orientation sensor 206. As shown in FIG. 2A, the hand 204 can be a left hand and the wrist 220 can be a left wrist. In FIG. 2B, the hand 204 can be a right hand and the wrist 220 can be a right wrist.

As mentioned previously, there can be a rotation of the computing device 202 with respect to one or more axes located at the wrist 220 of the hand 204 holding the device 202. For example in FIG. 2A, the user can rotate his/her left wrist, which in turn moves the computing device 202, whether knowingly/intentionally or not. There can be at least three axes with respect to the left wrist including a horizontal axis (i.e., abscissa or X axis) 224, a vertical axis (i.e., ordinate or Y axis) 226, and a depth axis (i.e., applicate or Z axis) 228. Each of the left wrist axes (e.g., 224, 226, 228) can be substantially parallel (i.e., parallel within an allowable deviation) to a respective one of the computing device axes (e.g., 114, 116, 118 in FIG. 1). In some embodiments, the applicate axis 228 can be located within an allowable threshold distance 230 from a lower left corner of the front face of the computing device.

Similarly, in the example of FIG. 2B, the user can rotate his/her right wrist, which moves the computing device 202. There can be at least three axes with respect to the right wrist including a horizontal axis (i.e., abscissa or X axis) 234, a vertical axis (i.e., ordinate or Y axis) 236, and a depth axis (i.e., applicate or Z axis) 238, each of the right wrist axes (e.g., 234, 236, 238) being substantially to a respective one of the computing device axes (e.g., 114, 116, 118 in FIG. 1).

Utilizing at least in part the one or more orientation sensors 206, the computing device 202 can determine various changes in the orientation of the device 202 with respect to the wrist axes. When the user moves the device 202 by rotating with respect to the ordinate wrist axis (e.g., 226, 236), the applicate wrist axis (e.g., 228, 238), or both wrist axes, the one or more orientation sensors 206 can detect the movement/rotation.

The computing device 202, utilizing at least in part the orientation sensor(s) 206, can differentiate between whether the device 202 is being rotated with respect to the ordinate axis 226 closer to (i.e., within an allowable distance from) the left side of the front face of the device 202, or with respect to the ordinate axis 236 closer to the right side of the front face of the device 202. Based on this differentiation, the computing device 202 can determine that the hand 204 holding the device 202 is a left hand when the rotation is with respect to the ordinate axis 226 closer to the left side of the device 202, or that the hand 204 is a right hand when the rotation is with respect to the ordinate axis 236 closer to the right side of the device 202.

Similarly, the computing device 202, utilizing the orientation sensor(s) 206, can differentiate between whether the device 202 is being rotated with respect to the applicate axis 228 that is near/closer to (i.e., within an allowable distance from) the lower left corner of the front face of the device 202, or with respect to the applicate axis 238 that is near the lower right corner of the front face of the device 202. Based on this differentiation, the computing device 202 can determine that the hand 204 holding the device 202 is a left hand when the rotation is with respect to the applicate axis 228 near the lower left corner of the front face of the device 202, or that the hand 204 is a right hand when the rotation is with respect to the applicate axis 238 near the lower right corner of the device's front face. Accordingly, the device 202 can determine/identify which hand 204 (left or right) is holding the device 204 based at least in part on a rotation(s) with respect to the ordinate wrist axis (e.g., 226, 236), the applicate wrist axis (e.g., 228, 238), or any combination of both axes. In some embodiments, the applicate axis 238 can be located within an allowable threshold distance 240 from a lower right corner of the front face of the computing device.

Figure 3:
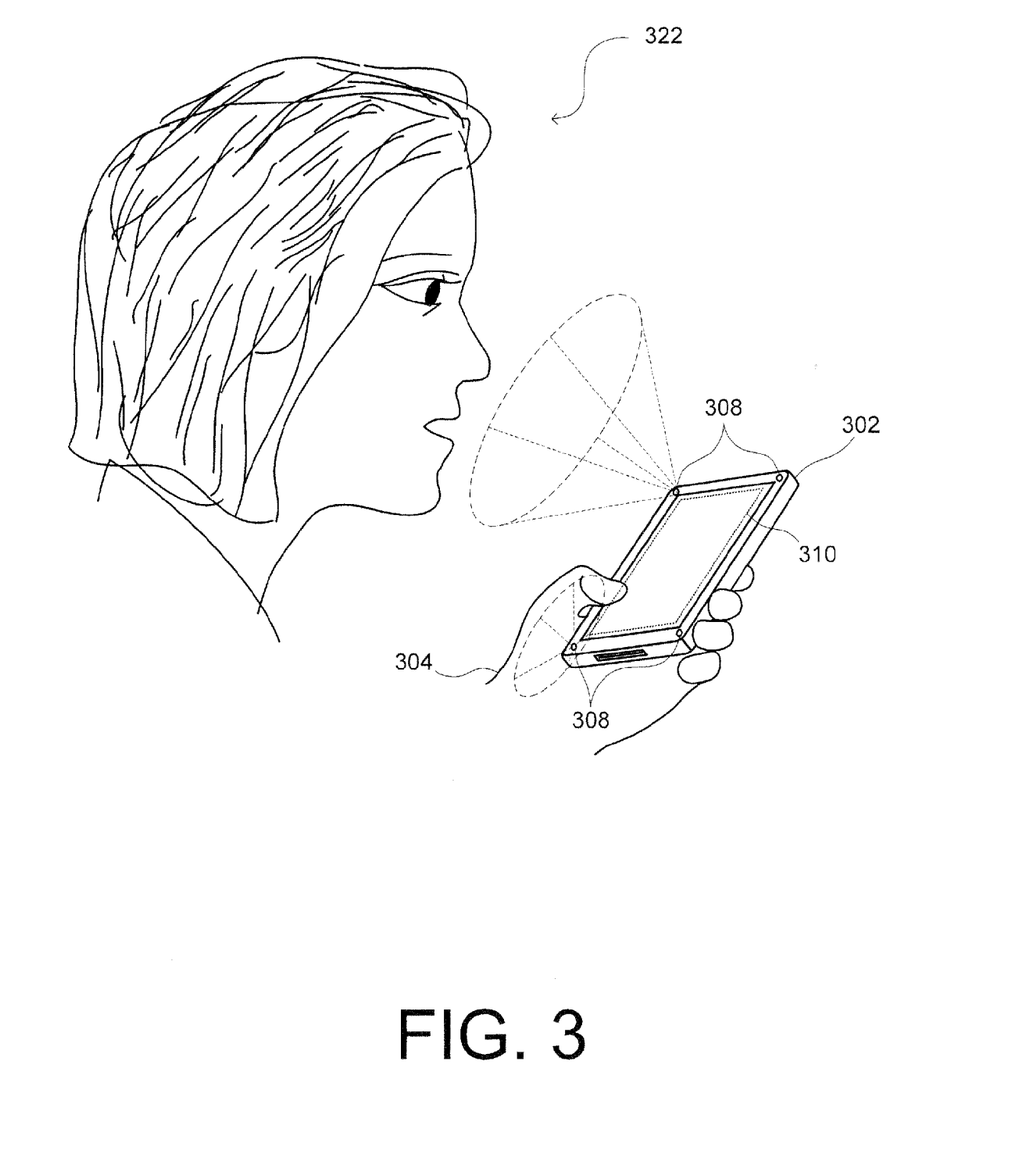
FIG. 3 illustrates an example embodiment for determining which hand is holding a device, based on finger position.

FIG. 3 illustrates an example embodiment for determining which hand is holding a device, based on finger position. In FIG. 3, there can be a computing device 302 and a hand 304 of a user 322. The hand 304 can be holding the device 302. In some embodiments, the device 302 can comprise one or more cameras 308 and one or more hover sensors 310.

The one or more camera 308 can capture an image including a finger of the hand 304 holding the device 302. For example as shown in FIG. 3, a camera 308 on the lower left corner of the front face of the device 302 can capture a image (e.g., still image(s), real-time video, periodic pictures, etc.) of a thumb of the hand 304. The image can be processed and analyzed to recognize the thumb and to determine that the thumb approximately extends from the lower left corner of the device's front face toward an upper right direction. Continuing with the example, based on this determination (and/or other information) the device 302 can determine that the thumb belongs to a left hand and thus determine that the hand 304 is a left hand, as shown in FIG. 3.

In some embodiments, the device 302 can comprise one or more hover sensors 310. The hover sensor(s) 310 can detect the presence and location of a finger hovering over the front face of the device 302. For example in FIG. 3, the hover sensor(s) 310 can detect that the user's thumb is hovering over the front face of the device 302. The computing device 302 can utilize the hover sensor 302 to determine that the thumb approximately extends and hovers over the lower left device corner toward an upper right direction. Continuing with the example, based on this determination (and/or other information) the device 302 can determine that the thumb belongs to a left hand and thus determine that the hand 304 is a left hand, as shown in FIG. 3.

However, if the camera(s) 308 and/or hover sensor(s) 310 detect a thumb approximately extending/hovering over the device's front face from the lower right corner toward an upper left direction, then the device 302 can determine that the thumb belongs to a right hand and that the hand 304 is a right hand (not shown in FIG. 3).

In some embodiments, the camera(s) 308 can also be utilized for capturing an image of the head of the user 322 (e.g., head tracking). The position of the head can be determined by the computing device based on the captured image (e.g., still image(s), real-time video, periodic pictures, etc.). Head tracking can be useful for facilitating determination/normalization of the orientation of the computing device 302. In some embodiments, the position of the user's finger (e.g., thumb) can be determined relative to the position of the user's head.

Figure 4:
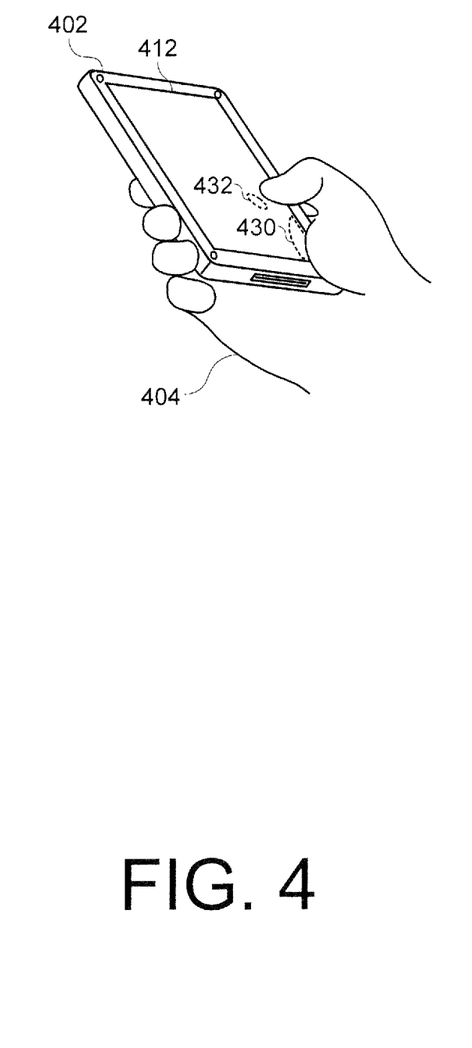
FIG. 4 illustrates an example embodiment for determining which hand is holding a device, utilizing touch sensing.

FIG. 4 illustrates an example embodiment for determining which hand is holding a device, utilizing touch sensing. In FIG. 4, there can be a computing device 402 and a user's hand 404 holding the device 402. The computing device can comprise one or more touch sensors 412. In some embodiments, the touch sensor(s) 412 can work in conjunction with a display of the computing device 402. For example, the touch sensor(s) 412 can be associated with a touch screen of the computing device 402. In some embodiments, the touch sensor 412 can be associated with an Interpolating Force Sensitive Resistance (IFSR) component (e.g., IFSR strip).

In some embodiments, the touch sensor(s) 412 can detect a touching of the screen by the thenar area of the hand 404 (i.e., the area of the palm of the hand at the base of the thumb). The computing device 402, utilizing the touch sensor 412, can detect that an area of the sensor 412 is being touched and can determine what object is doing the touching. For example as shown in FIG. 4, the device 402 can utilize the touch sensor 412 to detect that an area 430 of the sensor 412 is being touched and determine that the area 430 being touched is larger than an area that would be touched by a fingertip. Moreover, the device 402 can determine that the larger area 430 being touched is located at approximately the right and/or bottom side of the front face of the device 402. Accordingly, the device 402 can determine that a thenar area of a right hand is touching the larger area 30 and thus the hand 404 is a right hand.

Similarly, the device 402 can determine that a thenar area of a left hand is touching the sensor 412, and thus that the hand 404 holding the device 402 is a left hand, when a larger area (relative to an area that would be touched by a fingertip) near the left and/or bottom of the sensor 412 is being touched.

Moreover, in some embodiments, the touch sensor 412 can determine a shape of an imprint made by a fingertip (including the tip of a thumb) touching the sensor 412. For example as shown in FIG. 4, a particular finger such as a right thumb of the user can have a substantially (within an allowable deviation) diagonal/oblong imprint 432 slanting from bottom right to upper left, which can be distinguished from a left thumb having, for example, a substantially diagonal/oblong imprint slanting from bottom left to upper right. Accordingly, the device 402 can determine which hand is holding the device 402 based on touch sensing.

Further, in some embodiments, the touch sensor 412 can distinguish between different kinds of fingertips/objects. For example, the tip of a thumb might make an oblong imprint when touching the sensor 412 where the tip of a pointing finger (e.g., an index finger, a middle finger, etc.) might make a more rounded imprint when touching the sensor 412. Moreover, the tip of a pointing object (e.g., stylus) might make a smaller, more concentrate imprint when touching the sensor 412.

Figure 5A:
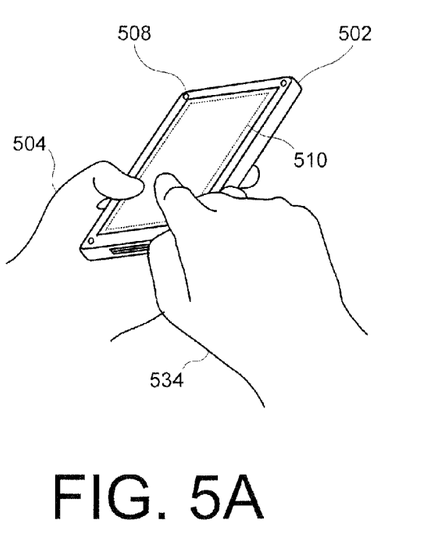
FIG. 5A illustrates an example embodiment for determining which hand is holding a device, based on finger position.
Figure 5B:
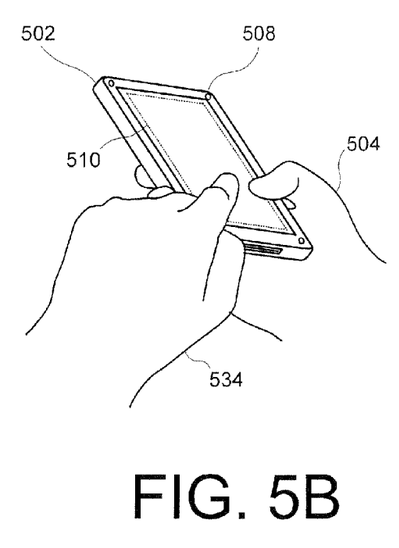
FIG. 5B illustrates an example embodiment for determining which hand is holding a device, based on finger position.

FIG. 5A and FIG. 5B each illustrate an example embodiment for determining which hand is holding a device, based on finger position. In each example, there can be a computing device 502, a user's first hand 504 that holds the device 502, and a user's second hand 534 that interacts with the device 504. As shown in each example, the computing device 502 can comprise one or more cameras 508 and one or more hover sensors 510.

In each example, utilizing the one or more cameras 508 and/or hover sensors 510, the computing device 502 can detect a fingertip of a finger of the second hand 534 that is used to interact with the device 502 (e.g., tapping a touch screen of the device). In some embodiments, the one or more cameras 508 and/or hover sensors 510 can determine that the fingertip of the second hand 534 moves along a substantially diagonal path (i.e., a path that is within an allowable deviation from being diagonal). For example, in FIG. 5A, the device 502 can determine that the fingertip of the second hand 534 moves in a substantially diagonal path from the bottom right corner of the device's front toward an upper left direction. From this determination, the device 502 can figure out that a finger from a right hand is interacting with the device 502 and thus the second hand 534 is a right hand, thereby making it likely that the first hand 504 holding the device is a left hand. In a similar example with reference to FIG. 5B, the device 502 can determine that the fingertip of the second hand 534 moves in a substantially diagonal path from the bottom left corner of the device's front toward an upper right direction. Based on this, the device 502 can determine that a finger from a left hand is interacting with the device 502, that the second hand 534 is a left hand, and that the first hand 504 is therefore a right hand.

In some embodiments, the device can determine that a pointing object (used by another hand different from the hand holding the device; e.g., a stylus) is hovering in a particular direction over the front face of the device. For example, the device can determine that the hand holding the device is the left hand when the occlusion of the pointing object extends from a lower right position with respect to the front face of the computing device toward an upper left direction (e.g., because the pointing object is being held by the right hand). Similarly, the device can determine that the hand holding the device is the right hand when the occlusion extends from a lower left position with respect to the front face of the computing device toward an upper right direction (e.g., because the pointing object is being held by the left hand).

In some embodiments, the one or more orientation sensors and the one or more touch sensors of the computing device 502 can be utilized to detect vibrations of the device 502. For example, if there tends to be less vibration on a right side of (e.g., less vibration near a bottom right corner of) the device 502, then it is likely that the device 502 is being held at a right (e.g., bottom right) portion, likely by a right hand. In contrast, if there tends to be less vibration on a left side of (e.g., less vibration near a bottom left corner of) the device 502, then it is likely that the device 502 is being held at a left (e.g., bottom left) portion, likely by a left hand.

Figure 6A:
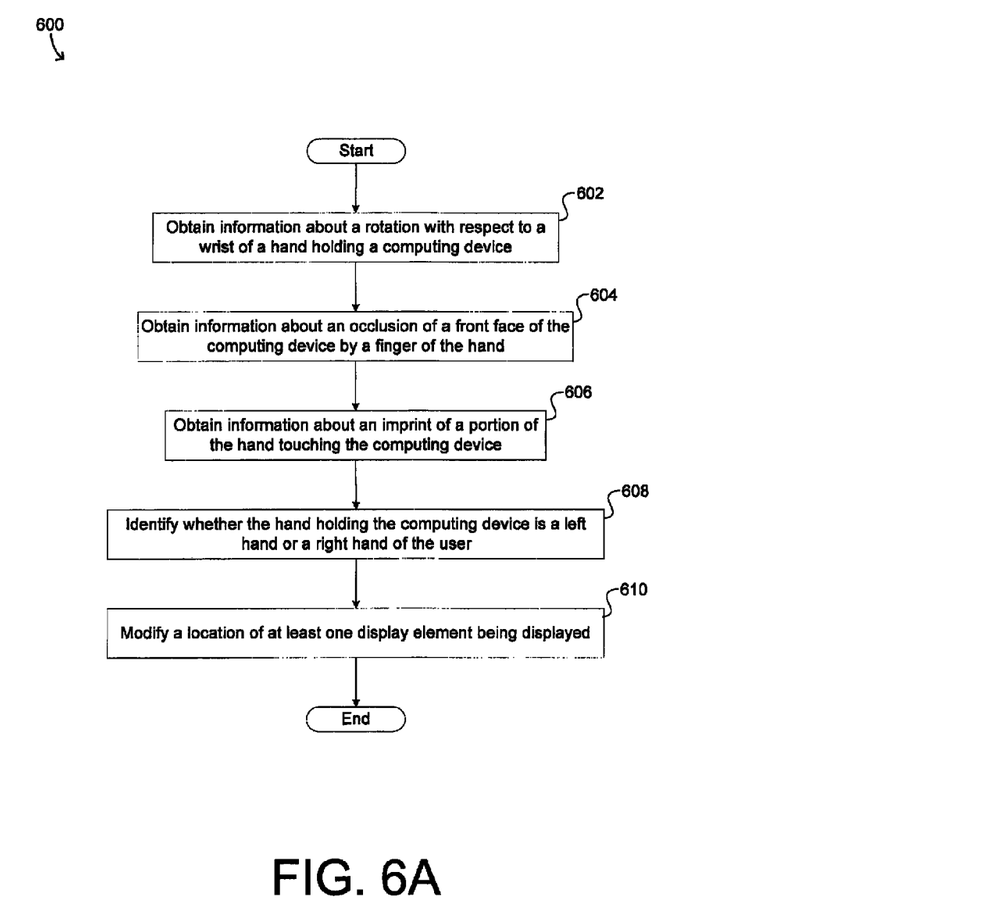
FIG. 6A illustrates an example method embodiment for determining which hand is holding a device.

FIG. 6A illustrates an example method embodiment 600 for determining which hand is holding a device. It should be understood that there can be additional, fewer, or alternative steps performed in similar or alternative orders, or in parallel, within the scope of the various embodiments unless otherwise stated. The example method embodiment 600 can start with obtaining information (if any) about a rotation with respect to a wrist of a hand holding a computing device, at step 602. At step 604, the example method 600 can obtain information (if any) about an occlusion of a front face of the computing device by a finger of the hand. Step 606 can including obtaining information (if any) about an imprint (i.e., contact) of a portion of the hand touching the computing device. The example method 600 can then identify whether the hand holding the computing device is a left hand or a right hand of the user, at step 608. Then at step 610, the method 600 can modify a location of at least one element being displayed.

Figure 6B:
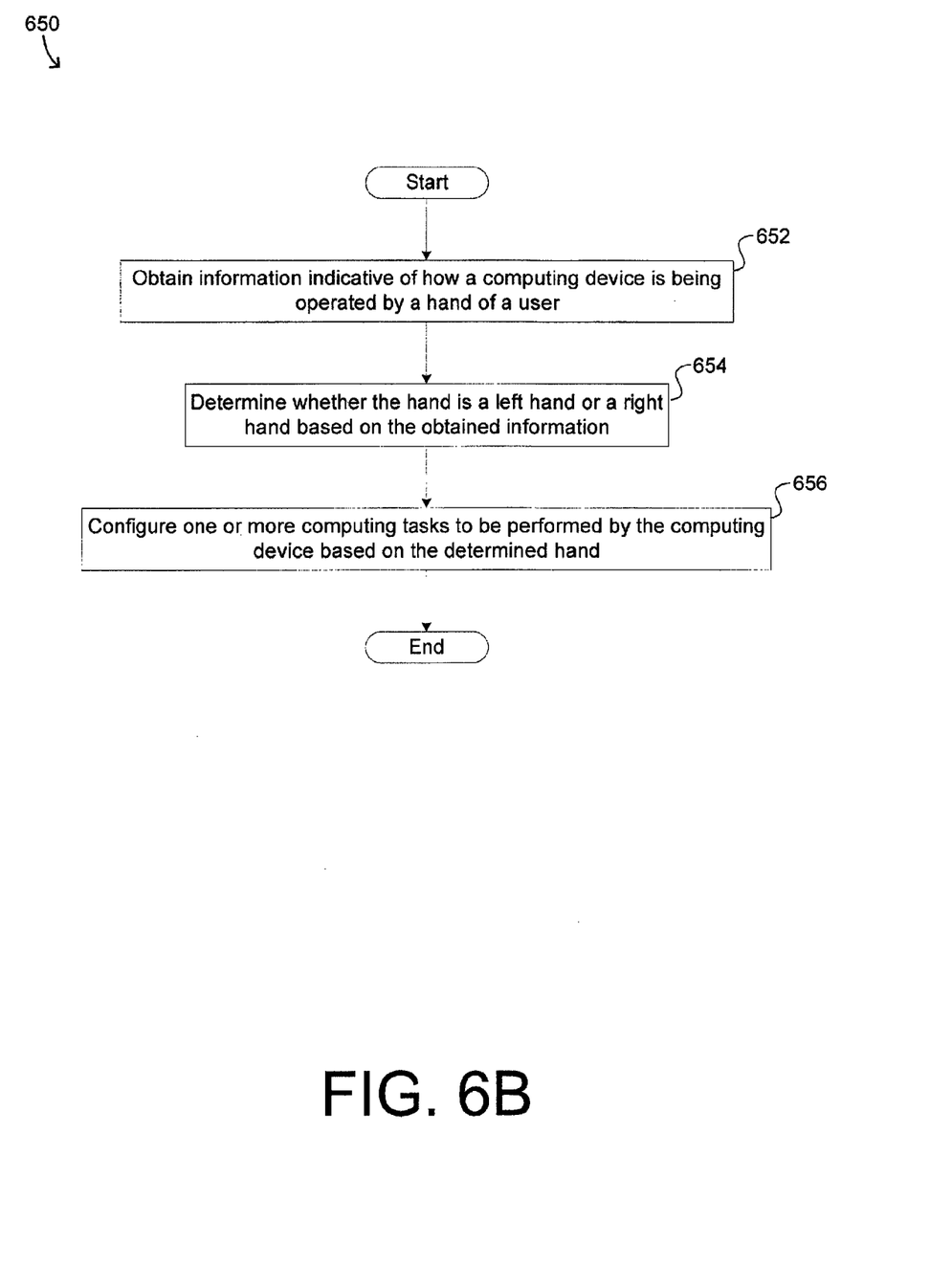
FIG. 6B illustrates an example method embodiment for determining which hand is holding a device.

FIG. 6B illustrates an example method embodiment 650 for determining which hand is holding a device. Again, it should be understood that there can be additional, fewer, or alternative steps performed in similar or alternative orders, or in parallel, within the scope of the various embodiments unless otherwise stated. At step 652, the example method embodiment 650 can obtain information indicative of how a computing device is being operated by a hand of a user. For example, the method 650 can obtain information indicative of how a computing device is being held, moved, used, etc., by the hand of the user. The information can include (but is not limited to) orientation information, occlusion information, touch information, system information (e.g., battery life information, device state information), etc. The orientation information can be indicative of at least one direction in which the computing device is rotated with respect to a wrist of a hand holding the computing device. The occlusion information can be indicative of an occlusion of a finger of the hand with respect to a front face of the computing device. The touch information can be indicative of an imprint (i.e., contact) by at least one portion of the hand touching the at least one touch sensor. At step 654, the example method 650 can determine whether the hand is a left hand or a right hand (or both hands). Step 656 includes configuring one or more computing tasks to be performed by the computing device based on the determined hand. The one or more computing tasks can include modifying a location at which a user interface element is displayed on a display of the computing device.

In some embodiments, the amount and/or range of rotation of the device with respect to one or more wrist axes can be taken into consideration when determining which hand is holding the computing device. For example, if the range of rotation with respect to an applicate wrist axis is larger in the clockwise direction than in the counterclockwise direction, then it is likely that the device is being held by a left hand.

In some embodiments, the pivot point of a thumb of a hand of the user can also be taken into consideration. For example, the device can capture occlusion information using at least one of a camera or a hover sensor of the computing device. The occlusion information can be indicative of an occlusion of the thumb of the hand with respect to a front face of the computing device. If the user moves the thumb, the camera and/or hover sensor can capture the occlusion change (e.g., change in direction of occlusion). Based on the occlusion change, the device can determine that the thumb has moved and thus can determine the pivot point of the thumb. For example, if the pivot point of the thumb is left of the center of the device's front face, then the thumb is likely a left hand thumb and the hand holding the device is likely the user's left hand. If the pivot point of the thumb is right of the center of the device's front face, then the thumb is likely a right hand thumb and the hand holding the device is likely the user's right hand. As such, determining the pivot point of the user's thumb can also contribute to determining which hand is holding the device.

In some embodiments, determining which hand is holding the device can be based at least in part on analyzing the trajectory of a thumb or a finger as it approaches the screen, using capacitive hover detection, where the capacitive touch sensor detects the presence of the digit before it touches the screen.

In some embodiments, how a particular user holds and/or interacts with the device can be learned over time. For example, the device can learn over time that if a particular user holds, moves, and/or interacts with the device in a particular manner, then he/she is using a particular hand. Accordingly, hand determination can be personalized for a particular user.

In some embodiments, the computing device can be normalized/adjusted for disturbances/interferences caused by the environment (e.g., vibrations due to walking, bumpiness caused by a car/train ride, turbulence on a plane, etc.). For example, the computing device can utilize tracking of the user's head to identify and filter out the environmental disturbances/interferences. In another example, the computing device can access environmental disturbance/interference models to recognize environmental disturbances/interferences and filter them out.

In some embodiments, the computing device can comprise one or more light sensors to determine whether the device is in a pocket, purse, bag, backpack, etc. In some embodiments, the device can comprise one or more infrared (IR) light emitters, which can be useful for determining whether the device is in in a pocket, purse, bag, backpack, etc., and/or for illumination in a dark environment.

Moreover, as discussed above, the one or more orientation sensors (e.g., gyroscope, accelerometer, etc.) of the computing device can be utilized to determine a pivot point for a tilt/rotation or other movement to the device. How a user moves the device in his/her left hand can be distinguishable from how the user moves the device in his/her right hand. For example, in some embodiments, the pivot point for the movement of the device can be at an elbow joint of the user, such that movement of the device with respect to the left elbow joint can be different movement of the device at the right elbow joint. Based on this movement (e.g., rotation, tilt) differentiation between the left and right elbow joints, the device can determine the hand that holds the device. In some embodiments, the pivot point for the movement of the device can be at other places as well, such as at the shoulder joint of the user.

Furthermore, in some embodiments, the computing device can comprise at least one touch sensor. The at least one touch sensor can obtain information that is indicative of an imprint (i.e., contact) on the at least one touch sensor made by a portion of a hand of the user. The computing device can determine that the imprint is an imprint of a tip of a thumb of the hand. The device can also determine that the hand is the left hand when the imprint has an oblong shape slanting from a lower left position with respect to the at least one touch sensor toward an upper right direction. Further, the device can determine that the at least one hand is the right hand when the imprint has an oblong shape slanting from a lower right position with respect to the at least one touch sensor toward an upper left direction.

Various embodiments consistent with the present disclosure can also be implemented to take into account the preferred hand and/or handedness of the user. For example, if the device more often than not determines that the device is being held by the right hand of the user, then the user likely prefers using his/her right hand to use the device and/or is right handed. Adjustments/customizations can be made with respect to computing tasks (e.g., display of content, display of interfaces, execution of applications, etc.) performed by the computing device based on the determined preferred hand and/or handedness.

Figure 7:
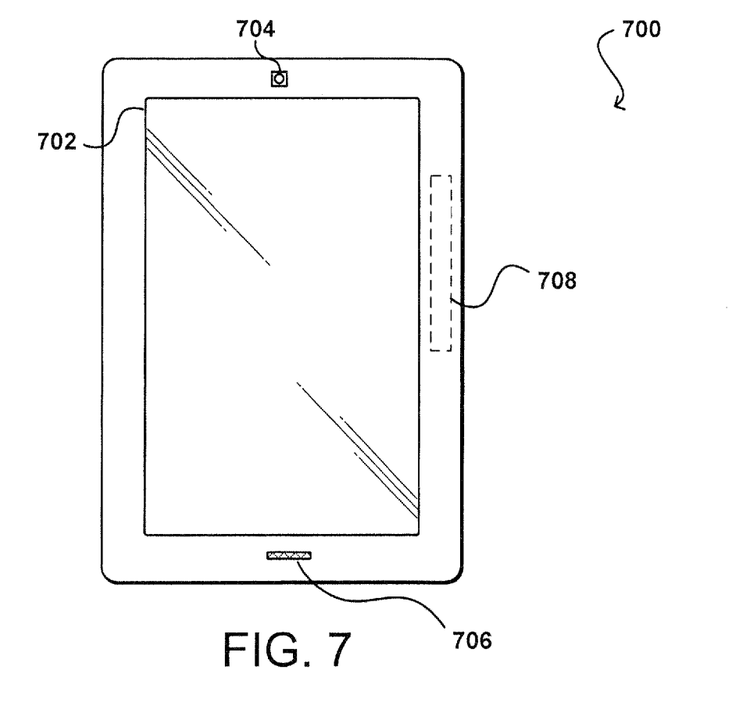
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
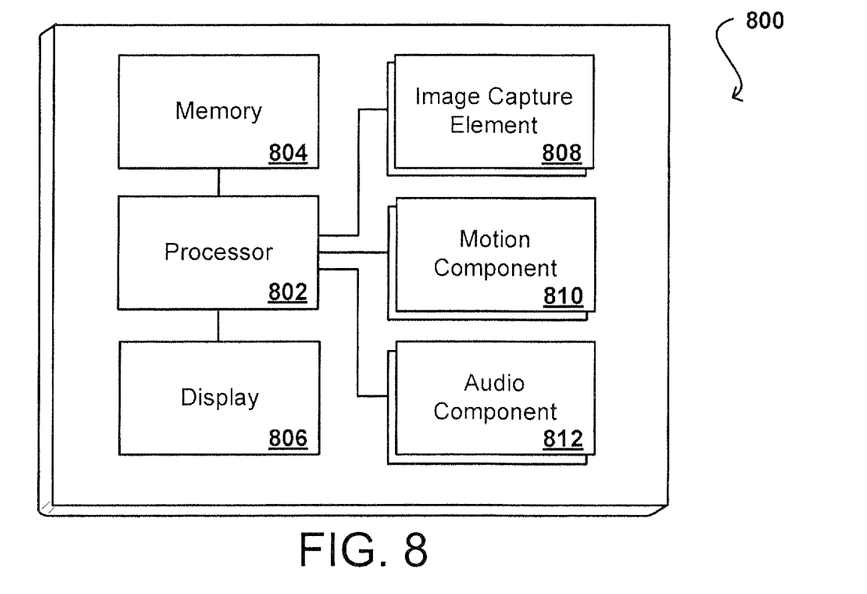
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
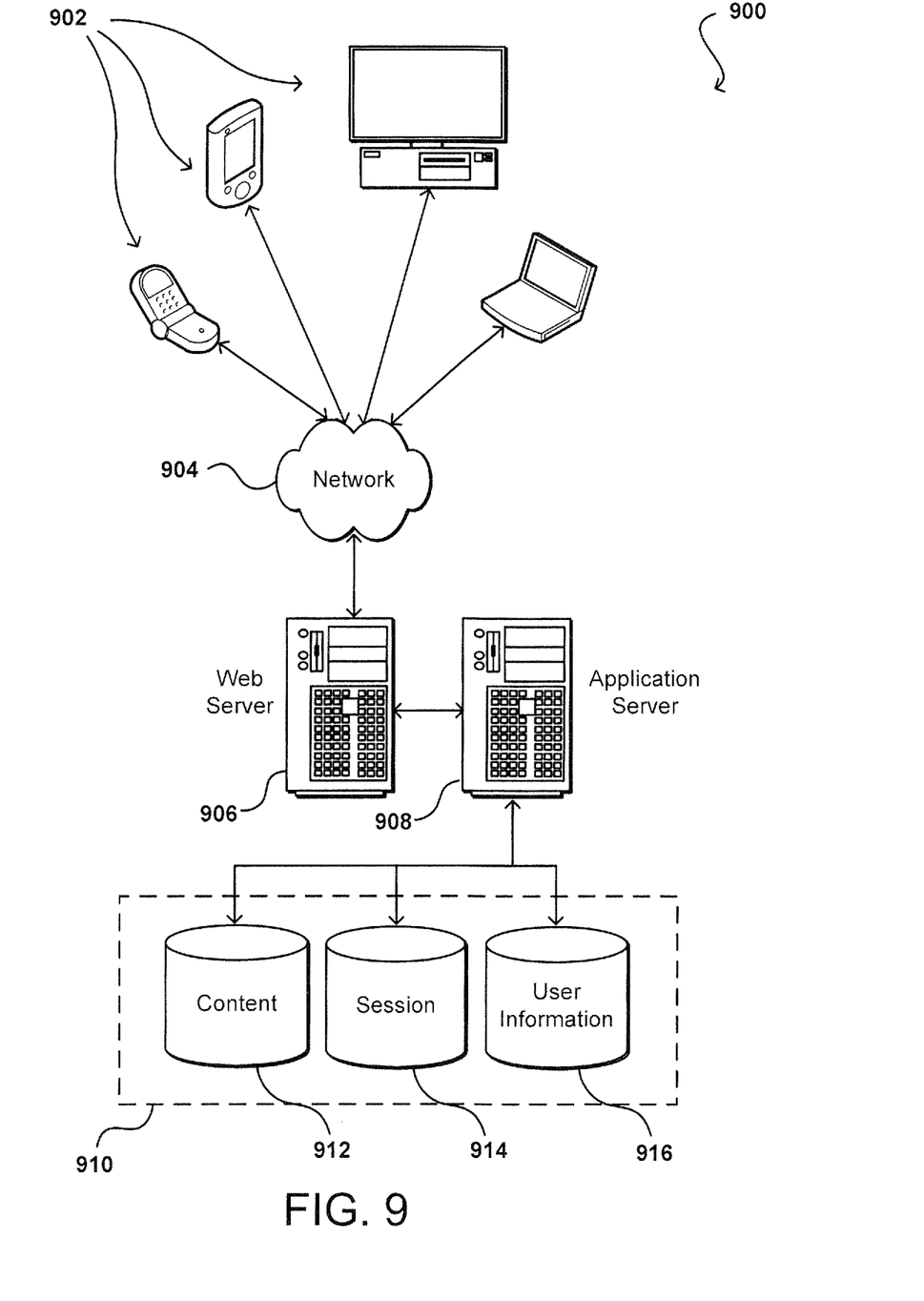
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or readonly memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for identifying which hand of a user is holding a computing device, comprising:
   capturing rotation information using one or more sensors of the computing device, the rotation information indicative of at least one axis about which the computing device is rotated, the at least one axis being on a first side or a second side of the computing device corresponding to a location of a wrist of a hand holding the computing device;
   capturing occlusion information using a camera of the computing device, the occlusion information indicative of an occlusion of a front face of the computing device by a finger of the hand;
   determining which hand of the user is holding the computing device based, at least in part, on the location of the at least one axis and a location of the finger forming the occlusion; and
   modifying a location of at least one user interface element being displayed on a display of the computing device based, at least in part, on which hand of the user is holding the computing device.

2. The computer-implemented method of claim 1, further comprising:
   identifying that the hand holding the computing device is the left hand based at least in part on the at least one axis including at least one of an applicate axis associated with the wrist, the applicate axis located within an allowable threshold distance from a lower left corner of the front face of the computing device, or an ordinate axis substantially parallel to the wrist, the ordinate axis being located left of a center ordinate axis of the computing device; or
   identifying that the hand holding the computing device is the right hand based at least in part on the at least one axis including at least one of the applicate axis associated with the wrist, the applicate axis located within an allowable threshold distance from a lower right corner of the front face of the computing device, or the ordinate axis substantially parallel to the wrist, the ordinate axis being located right of the center ordinate axis of the computing device.

3. The computer-implemented method of claim 1, further comprising:
   determining that the occlusion of the finger is an occlusion of a thumb; and
   identifying that the hand holding the computing device is the left hand when the occlusion of the thumb extends from a lower left position with respect to the front face of the computing device toward an upper right direction; or
   identifying that the hand holding the computing device is the right hand when the occlusion of the thumb extends from a lower right position with respect to the front face of the computing device toward an upper left direction.

4. A computer-implemented method comprising:
   obtaining rotation information using one or more sensors of a computing device, the rotation information indicative of at least one axis about which the computing device is rotated, the at least one axis being on a first side or a second side of the computing device corresponding to a location of a wrist of a hand holding the computing device;
   determining whether the hand is a left hand or a right hand of the user based at least in part on the location of the wrist of the hand holding the computing device; and
   configuring one or more computing tasks to be performed by the computing device based, at least in part, on whether the at least one hand is the left hand, the right hand, or both hands of the user, the one or more computing tasks including modifying a location at which a user interface element is displayed on a display of the computing device.

5. The computer-implemented method of claim 4, wherein the one or more sensors include at least one orientation sensor, and wherein the obtained information is indicative of how the orientation of the computing device is changed based on a rotation by the hand of the user, further comprising:
   determining that the hand is the left hand based on the at least one axis including at least one of an applicate axis located within an allowable threshold distance from a lower left corner of a front face of the computing device, or an ordinate axis located left of a center ordinate axis of the computing device; or determining that the hand is the right hand based on the at least one axis including at least one of an applicate axis located within an allowable threshold distance from a lower right corner of the front face of the computing device, or an ordinate axis located right of the center ordinate axis of the computing device.

6. The computer-implemented method of claim 4, wherein the one or more sensors include a camera, and wherein the obtained information is indicative of at least a partial occlusion with respect to a front face of the computing device by a finger of the at least one hand of the user, further comprising:
  determining the finger of the at least one hand to be a thumb of the hand; and
  determining that the hand is the left hand when the occlusion extends from a lower left position with respect to the front face of the computing device toward an upper right direction; or
  determining that the hand is the right hand when the occlusion extends from a lower right position with respect to the front face of the computing device toward an upper left direction.

7. The computer-implemented method of claim 4, wherein the one or more sensors include a camera, and wherein the obtained information is indicative of at least a partial occlusion with respect to a front face of the computing device by a finger of the at least one hand of the user, further comprising:
  determining the finger of the at least one hand to be a pointing finger of another hand different from the at least one hand; and
  determining that the at least one hand is the left hand when the occlusion extends from a lower right position with respect to the front face of the computing device toward an upper left direction; or
  determining that the at least one hand is the right hand when the occlusion extends from a lower left position with respect to the front face of the computing device toward an upper right direction.

8. The computer-implemented method of claim 4, wherein the one or more sensors include at least one touch sensor, and wherein the obtained information is indicative of a contact with the at least one touch sensor of the computing device made by a portion of the hand of the user, further comprising:
  determining the contact to be an imprint of a thenar area of the at least one hand; and
  determining that the at least one hand is the left hand when the imprint of the thenar area touching the one or more touch sensors is located left of a center ordinate axis of the computing device; or
  determining that the at least one hand is the right hand when the imprint of the thenar area touching the one or more touch sensors is located right of the center ordinate axis of the computing device.

9. The computer-implemented method of claim 4, wherein the one or more sensors include a camera, and wherein the obtained information is indicative of at least a partial occlusion with respect to a front face of the computing device by a pointing object used by another hand different from the at least one hand, further comprising:
  determining that the at least one hand is the left hand when the occlusion extends from a lower right position with respect to the front face of the computing device toward an upper left direction; or
  determining that the at least one hand is the right hand when the occlusion extends from a lower left position with respect to the front face of the computing device toward an upper right direction.

10. The computer-implemented method of claim 4, wherein the one or more sensors include at least one camera, further comprising:
  capturing an image including a head of the user using the at least one camera; and
  determining a normalized orientation of the computing device based at least in part on the image including the head of the user.

11. The computer-implemented method of claim 4, wherein the configuring the one or more computing tasks includes selecting a plurality of movement thresholds for gesture recognition by the computing device, the selecting the plurality of movement thresholds being based at least in part on whether the computing device is being held in the left hand, the right hand, or both hands of the user.

12. The computer-implemented method of claim 4, wherein the configuring the one or more computing tasks further includes modifying a location of a visual content to be displayed on the display of the computing device, the modifying the location being based at least in part on whether the computing device is being held in the left hand, the right hand, or both hands of the user.

13. A computing device comprising:
  one or more device sensors;
  a display;
  a processor; and
  a memory device including instructions that, when executed by the processor, cause the computing device to:
    obtain information, via the one or more device sensors, indicative of at least one axis about which the computing device is rotated, the at least one axis being on a first side or a second side of the computing device corresponding to a location of a wrist of a hand holding the computing device;
    determine whether the hand is a left hand or a right hand of the user based at least in part on the location of the wrist of the hand holding the computing device; and
    configure one or more computing tasks to be performed by the computing device based, at least in part, on whether the at least one hand is the left hand, the right hand, or both hands of the user, the one or more computing tasks including modifying a location at which a user interface element is displayed on the display.

14. The computing device of claim 13, wherein the one or more device sensors includes at least one gyroscope, accelerometer, compass, magnetometer, inertia sensor, or virtual sensor.

15. The computing device of claim 14, wherein the one or more device sensors includes at least two orientation sensors, the at least two orientation sensors configured to determine a location with respect to the computing device at which a vibration level exceeds a specified threshold when the computing device is tapped by a finger of the hand, the tapping occurring within an allowable distance from the location.

16. The computing device of claim 13, further comprising:
  a light sensor configured to facilitate in determining whether the computing device is in at least one of a pocket, a bag, or a dark environment.

17. The computing device of claim 13, further comprising:
  an infrared (IR) light emitter configured to provide illumination in a dark environment.

18. A non-transitory computer-readable storage medium including instructions that, when executed by a processor of a computing device, cause the computing device to:

obtain information, via one or more device sensors, indicative of at least one axis about which the computing device is rotated, the at least one axis being on a first side or a second side of the computing device corresponding to a location of a wrist of a hand holding the computing device;

determine whether the hand is a left hand or a right hand of the user based at least in part on the location of the wrist of the hand holding the computing device; and configure one or more computing tasks to be performed by the computing device based, at least in part, on whether the at least one hand is the left hand, the right hand, or both hands of the user, the one or more computing tasks including modifying a location at which a user interface element is displayed on a display of the computing device.

19. The non-transitory computer-readable storage medium of claim 18, wherein the one or more sensors include at least one orientation sensor, wherein the obtained information is indicative of how the orientation of the computing device is changed based on a rotation by the hand of the user, and wherein the instruction cause the computing device to further:

determine that the hand is the left hand based on the at least one axis including at least one of an applicate axis located within an allowable threshold distance from a lower left corner of a front face of the computing device, or an ordinate axis located left of a center ordinate axis of the computing device; or determine that the hand is the right hand based on the at least one axis including at least one of an applicate axis located within an allowable threshold distance from a lower right corner of the front face of the computing device, or an ordinate axis located right of the center ordinate axis of the computing device.

20. The non-transitory computer-readable storage medium of claim 18, wherein the one or more sensors include a camera, wherein the obtained information is indicative of at least a partial occlusion with respect to a front face of the computing device by a finger of the hand of the user, and wherein the instruction cause the computing device to further:

determine the finger of the hand to be a thumb of the hand; and determine that the hand is the left hand when the occlusion extends from a lower left position with respect to the front face of the computing device toward an upper right direction; or determine that the hand is the right hand when the occlusion extends from a lower right position with respect to the front face of the computing device toward an upper left direction.

21. The non-transitory computer-readable storage medium of claim 18, wherein the configuring the one or more computing tasks includes selecting a plurality of movement thresholds for gesture recognition by the computing device, the selecting the plurality of movement thresholds being based at least in part on whether the hand is the left hand, the right hand, or both hands of the user.

22. The non-transitory computer-readable storage medium of claim 18, wherein the configuring the one or more computing tasks further includes modifying a location of a visual content to be displayed on the display of the computing device, the modifying the location being based at least in part on whether the hand is the left hand, the right hand, or both hands of the user.

* * * * *